United States Patent [19]

Mavrovic

[11] 3,929,878

[45] Dec. 30, 1975

[54] DECOMPOSITION OF AMMONIUM CARBAMATE

[76] Inventor: Ivo Mavrovic, 530 E. 72nd St., New York, N.Y. 10021

[22] Filed: May 10, 1971

[21] Appl. No.: 237,644

[52] U.S. Cl............................................ 260/555 A
[51] Int. Cl.²....................................... C07C 126/00
[58] Field of Search ................................ 260/555 A

[56] References Cited
UNITED STATES PATENTS

| | | | |
|---|---|---|---|
| 3,137,725 | 6/1964 | Cook et al. .......................... | 260/555 |
| 3,514,484 | 5/1970 | Wentworth .......................... | 260/555 |

Primary Examiner—James O. Thomas, Jr.
Assistant Examiner—A. Siegel
Attorney, Agent, or Firm—Flynn & Frishauf

[57] ABSTRACT

Ammonium carbamate in an aqueous urea solution containing the carbamate, urea, water and ammonia, obtained as a urea synthesis reactor effluent is decomposed, with the formation of a liquid phase containing urea, water, residual ammonium carbamate and residual ammonia, and a gaseous phase containing ammonia, carbon dioxide and water vapor. The liquid and gaseous phases are discharged into an upper portion of a decomposer and are separated effectively,

6 Claims, 1 Drawing Figure

U.S. Patent    Dec. 30, 1975    3,929,878
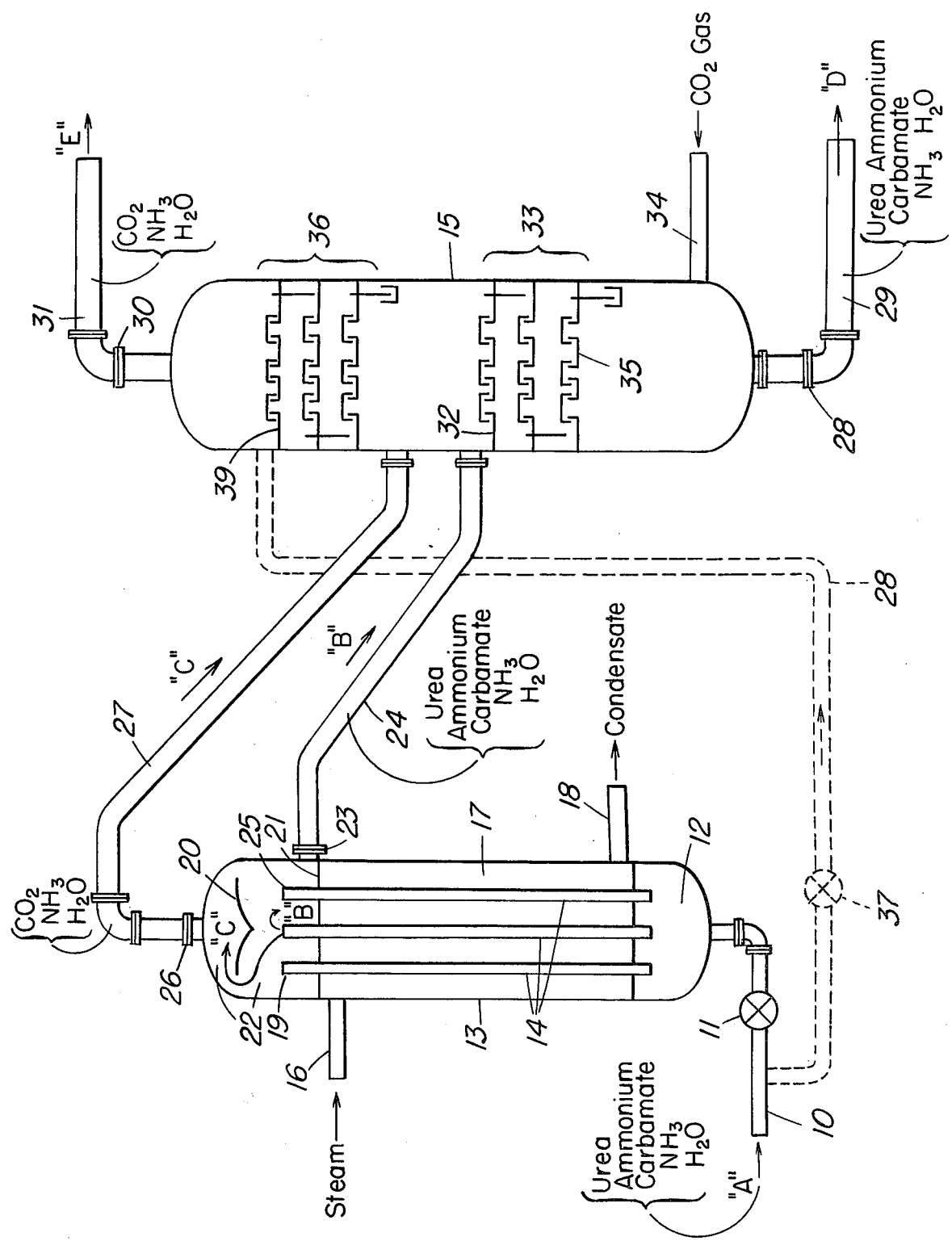
Inventor
Ivo Mavrovic
By Flynn & Frishauf
Attorneys

DECOMPOSITION OF AMMONIUM CARBAMATE

FIELD OF INVENTION

This invention has to do with the synthesis of urea, and more specifically with improved decomposition of ammonium carbamate which is formed in the urea synthesis. The invention also concerns a novel decomposition vessel.

BACKGROUND OF THE INVENTION

Urea is commercially obtained by reacting $NH_3$ and $CO_2$ in a reactor at elevated temperature and pressure. At urea synthesis conditions $NH_3$ and $CO_2$ instantaneously and completely react stoichiometrically to form ammonium carbamate. The latter is partially converted to urea and water within 20–30 minutes of residence in the reactor. Excess ammonia above the stoichiometric ratio with $CO_2$ is used in the reactor for the purpose of increasing the conversion of carbamate to urea. The urea synthesis reactor usually contains a urea solution comprising urea, water, excess ammonia and unconverted ammonium carbamate. For the purpose of separating the finished urea solution product from the unconverted reactants, the urea reactor effluent is usually let down in pressure through a reducing valve and is heated in a decomposer, and thus the unconverted ammonium carbamate is decomposed to gaseous $NH_3$ and $CO_2$. The gas is then expelled from the urea product solution together with the excess ammonia evaporated from the latter solution with some water.

The $NH_3$ and the $CO_2$ gas with water vapor thus recovered is usually absorbed in additional water to form an aqueous ammoniacal solution of ammonium carbamate and the solution thus obtained is recycled back to the urea synthesis reactor for total recovery.

The aqueous urea solution separated from the gas is usually further processed to its solid form, generally as prills.

Various methods of decomposing carbamate from the urea product solution have been proposed in the past.

According to prior art, the urea reactor effluent is let down in pressure through a pressure reducing valve and is introduced into a vessel functioning as a carbamate decomposer. The bottom part of this vessel is internally provided with either a steam coil or with an external steam heated reboiler type heat exchanger. The urea product solution containing the unconverted reactants is circulated by convection through the vessel. The unconverted reactants are vaporized, separated from the remaining aqueous urea product solution and are withdrawn from the vessel overhead. The urea product solution is withdrawn from the bottom section of the vessel.

The major drawback of this method is the fact that a considerable amount of the urea product, during the carbamate decomposition, is degraded to by-product biuret by heating, due to the relatively long residence time of the relatively hot urea solution in the reboiler and in the bottom section of the separator to which the decomposition products are directeed from the decomposer.

Still another drawback is the fact that a relatively large and expensive coil or heat exchanger must be provided for the decomposition of carbamate, due to the relatively low liquid velocity with respect to the heating surface of the steam coil or heat exchanger, and to the consequently poor overall heat transfer coefficient between the heat source and the urea product solution.

Furthermore, the urea reactor effluent is let down in pressure through a pressure reducing valve and is introduced into the bottom of the tube side of a vertical shell and tube heat exchanger. The liquid is forced to flow upwardly at a relatively high velocity through vertical tubes of the heat exchanger. The liquid is heated by condensing steam supplied to the shell side of the heat exchanger, the unconverted reactants are vaporized to gas, and the resulting mixture of liquid and gas exits the vertical decomposer overhead from the section thereof. This mixture of gas and liquid is usually delivered from the top of the heat exchanger to a separator through a pipe, which usually runs vertically upwardly from the decomposer exit, makes a 90° bend towards the horizontal and then, either horizontally or horizontally and sloping downwardly, runs to the separator. The separator usually consists of a vertical cylindrical vessel, in which the liquid aqueous urea product is separated in the bottom section thereof from the gaseous phase of $NH_3$, $CO_2$ and water vapor which rises and exits the separator overhead.

Such a once-through decomposer has the advantage over the reboiler type decomposer described above of producing a urea solution product with a relatively lower biuret content, due to the relatively higher velocity at which the urea solution is forced to flow upwardly through the tubes of the vertical decomposer and thus due to the relatively low residence time in the heating zone. But, due to the usual mechanical configuration of the exit piping described above, in which the mixture of gas and liquid are forced to flow upwardly through the exit piping from the top section of the vertical decomposer to the separator, the top section of the decomposer adjacent the exit from the tubes is flooded with liquid. This problem causes part of the degassed urea product solution to fall back into the vertical tubes, thus consequently causing back mixing with consequent product degradation of urea to biuret, irregular surging of liquid through the decomposer, and ultimately causes a general maloperation of the decomposer.

SUMMARY OF THE INVENTION

It has been found that by immediately removing the degassed aqueous urea product solution from the top section of the decomposer adjacent the exit from the heat exchanger tubes, and by removing only gas from the overhead top exit from the decomposer, and thus by not allowing the top section of the heat exchanger to become flooded with liquid, a greatly improved operation of the decomposer is attained. This improvement is with respect to biuret content in the degassed urea solution and the value of the heat transfer coefficient in the heat exchanger tubes, and ultimately with respect to the overall operation of the decomposer.

DRAWING

The single FIGURE illustrates schematically novel apparatus for carrying out the present invention.

SPECIFIC EMBODIMENTS OF THE INVENTION

Referring to the FIGURE, aqueous urea solution A containing ammonium carbamate and excess ammonia is passed through pipe 10, containing valve 11, into bottom section 12 of vertical shell and tube decomposer 13. The bottom section 12 communicates with the inlets of vertical tubes 14 of decomposer 13. The aqueous urea solution A is forced to flow upwardly through the vertical tubes 14 of the decomposer 13 due to the differential pressure existing between line 10 and separator 15. There is a pressure drop in tubes 14 and related equipment of, for example, 10–15 pounds per square inch. The aqueous urea solution A is heated in tubes 14 by steam (or other heat transfer medium) supplied through nozzle 16 to shell side 17 of decomposer 13. The steam supplied to the shell side 17 condenses on the relatively colder outer surface of tubes 14, thus supplying the heat required to heat the aqueous urea solution A flowing through the tubes 14, to decompose part of the ammonium carbamate contained in solution A to gaseous $NH_3$ and $CO_2$, to vaporize part of the water and part of the excess ammonia contained in solution A.

The condensed steam is withdrawn as condensate from the shell side 17 of decomposer 13 through nozzle 18.

A degassed aqueous urea solution B containing some residual undecomposed ammonium carbamate and some residual excess ammonia, and gaseous phase C containing $NH_3$, $CO_2$ and water vapor, is discharged from outlet end 19 of tubes 14 at a relatively high velocity and impinge upon the under surface of deflector plate 20. Plate 20 is preferably in the form of an inverted cone to deflect liquid toward the outer portions of the upper section of decomposer 13. Deflector plate 20 can also be a perforate or imperforate baffle or demister pad, for example. The liquid phase B is diverted downwardly toward tube sheet 21 of top section 22 of decomposer 13, and exits decomposer 13 through exit nozzle 23 and pipe 24. The exit nozzle 23 is located in such a manner as to be as close as possible to the top tube sheet 21 of decomposer 13, for the purpose of discharging any amount of liquid from the top tube sheet 21 and thus for the purpose of preventing liquid from accumulating on the top tube sheet 21 and from falling back into the tubes 14 through the top tube extension 25, which tubes 14 generally protude several inches above the horizontal top tube sheet 21.

The gaseous phase C separated from the degassed liquid phase B is withdrawn from the top section 22 of decomposer 13 through nozzle 26 and pipe 27.

Alternatively, the deflector plate 20, the discharge nozzle 26 and gas line 27 can be deleted and top section 22 can be closed. The gaseous phase C can be withdrawn from the top section 22 through the same nozzle 23, through which the degassed urea solution B is discharged. In this case (not shown), the nozzle 23 must be large enough to allow a smooth discharge of the resulting mixed phase to prevent flooding of the top section 22 of decomposer 13. This alternative is superior to prior art practice and is within the scope of this invention. However, the preferred operation is that illustrated in the FIGURE, since it is difficult to control the pressure drop due to flow of a mixed liquid/gas phase through the piping such as nozzle 23 and line 24.

The liquid phase B from pipe 24 and the gaseous phase C from pipe 27 are introduced into separator 15 for final and complete liquid-gas separation, so as to completely eliminate the residual final droplets of liquid which are usually entrained in the gaseous phase C.

Separator 15 can either consist of an empty vertical cylindrical vessel in which case the aqueous urea solution B is discharged from the bottm section thereof through nozzle 28 and pipe 29, and the gaseous phase C is discharged from its top section through nozzle 30 and pipe 31, or it can consist of a separator as described in U.S. Pat. Application Ser. No. 729,764, now U.S. Pat. No. 3,579,636. In this latter case, the liquid phase B is discharged from pipe 24 onto top tray 32 of lower tray section 33 of separator 15, and it flows downardly and countercurrently to a stream of $CO_2$, introduced into separator 15 through line 34 and below bottom tray 35 of the lower tray section 33. Degassed product urea solution D is removed from the bottom section of separator 15 through nozzle 28 and pipe 29.

The gaseous phase C enters an intermediate section of separator 15 below upper tray section 36 thereof. A smaller portion of the original aqueous urea solution A can be withdrawn from the main line 10 through valve 37 and line 38, and fed onto top tray 39 of upper tray section 36 of separator 15 to flow downwardly and countercurrently to the uprising flow of the gaseous phase C, for the purpose of reducing the water vapor content of the gaseous phase C.

Gaseous stream E, containing the original amount of $NH_3$ and $CO_2$ contained in the gaseous stream C and some water vapor, is discharged from the top section of the separator 15 through nozzle 30 and pipe 31.

Also contemplated is an alternative embodiment (not shown) in which the nozzle 23 and line 24 can be located below top tube sheet 21. For example, drain ducts can be provided to drain liquid phase down from the top tube sheet 21 and out of the decomposer at a level below top tube sheet 21. Also, top tube sheet 21 could be inclined downwardly from tubes 14 toward the shell of decomposer 13, and nozzle 23 and line 24 can be so located proximate the lowermost portions of top tube sheet 21 to drain out the liquid phase promptly. These alternatives, which are given only by way of example, also allow for prompt removal from the decomposer 13 of liquid phase which emerges from tubes 14, such that there is little or no opportunity for the liquid phase to reenter tubes 14 or to form a reservoir subject to a substantial residence time in said decomposer. The main requirement is that an outlet for the liquid phase be located relative to the uppermost extremities of the tubes 14 so that the liquid phase is removed from the decomposer 13 before it can accumulate or otherwise flow back into the tubes 14.

The invention is illustrated further by the following examples.

EXAMPLE 1

Referring to the FIGURE, 30,150 lbs/hr of an aqueous urea solution at 370°F. and 3200 psig, and containing 10,000 parts of urea, 6150 parts of ammonium carbamate, 8300 parts of excess ammonia and 5700 parts of water, is let down in pressure to 300 psig through reducing valve 11 and is introduced into the bottom section 12 of the tube side of decomposer 13. Due to the adiabatic flashing of the urea solution through valve 11, the solution is cooled to about 250°F.

The aqueous urea solution enters the tubes 14 of decomposer 13, wherein it is heated to 320°F. by condensing steam at 150 psig in the shell side 17 of decomposer 13. Due to the heating of the solution at a relatively reduced pressure, 5410 lbs/hr of ammonium carbamate decomposes to form 3050 lbs/hr of gaseous $CO_2$ and 2360 lbs/hr of gaseous $NH_3$; 7220 lbs/hr of excess ammonia are vaporized to gas and 1870 lbs/hr of water are vaporized from the aqueous urea solution.

Also due to the heating, 20 lbs/hr of urea are decomposed to form 3 lbs/hr of gaseous ammonia and 17 lbs/hr of by-product biuret. The total quantity of gas thus formed amounts to 14,503 lbs/hr.

The partially degassed aqueous urea solution contains 9980 lbs/hr of urea, 740 lbs/hr of ammonium carbamate, 1080 lbs/hr of excess ammonia, 3830 lbs/hr of water and 17 lbs/hr of by-product biuret, and the total quantity amounts to 15,647 lbs/hr.

The mixture of the gaseous and liquid phases exits the top 19 of the tubes 14 at 280 psig and at 320°F., and at a relatively high velocity. The liquid-gas mixture impinges upon the under surface of the deflector baffle 20, and 15,647 lbs/hr of liquid phase are separated from the gaseous phase. The separated liquid phase is diverted by the deflector baffle 20 towards the top tube sheet 21 which separates the shell side 17 from the top tube side 22 of decomposer 13; this liquid phase is forced to exit the top section 22 through nozzle 23 and pipe 24.

14,503 lbs/hr of gas rise through the top section 22 of decomposer 13 and are discharged through nozzle 26 and pipe 27.

In order to reproduce the operation of a decomposer according to the prior art described before, the liquid exit nozzle 23 is plugged and the total amount of the liquid-gas mixture is forced to exit the top section 22 through the top nozzle 26 at the same pressure of 280 psig. A noticeable drop in temperature of the liquid-gas mixture in line 27 and in separator 15 is immediately registered, even by maintaining the steam, condensing in the shell side 17 of decomposer 13, at the same pressure of 150 psig as before.

Due to this drop in temperature, a smaller amount of gas is formed in decomposer 13. 4930 lbs/hr of ammonium carbamate are decomposed to form 2780 lbs/hr of gaseous $CO_2$ and 2150 lbs/hr of gaseous ammonia; only 6950 lbs/hr of excess ammonia are vaporized from the urea solution and 1610 lbs/hr of water vapor are boiled off from the aqueous urea solution. Due to the fact that the top section 22 is now flooded with liquid and that consequently part of the degassed urea solution is back flowing into the tubes 14, 35 lbs/hr instead of 20 lbs/hr of urea solution are now decomposed, to form 5 lbs/hr of gaseous $NH_3$ and 30 lbs/hr of biuret. The total quantity of gas thus formed amounts to 13,495 lbs/hr.

This gaseous phase separated from the liquid phase contains 2780 lbs/hr of $CO_2$, 9105 lbs/hr of ammonia and 1610 lbs/hr of water vapor. The liquid phase separated from the liquid-gas mixture contains 9965 lbs/hr of urea, 1220 lbs/hr of ammonium carbamate, 1350 lbs/hr of excess ammonia, 4090 lbs/hr of water and 30 lbs/hr of by-product biuret.

By comparing the performance of the same decomposer under different operating conditions, as described above, the following is apparent:

|  | New | Prior Art |
| --- | --- | --- |
| Carbamate decomposed, lbs/hr | 5410 | 4939 |
| Carbamate decomposed, % | 88 | 80 |
| Excess ammonia vaporized, lbs/hr | 7220 | 6950 |
| Excess ammonia vaporized, % | 87 | 84 |
| Urea decomposed to biuret, lbs/hr | 20 | 35 |
| Urea decomposed to biuret, % | 0.2 | 0.35 |

As shown in this tabulation, a substantially greater amount of ammonium carbamate is decomposed in contrast with the prior art, yet with a substantially lesser amount of undesired biuret being formed.

EXAMPLE 2

Referring to the FIGURE, 15,647 lbs/hr of an aqueous urea solution at 320°F. and 280 psig in line 10, and containing 9980 lbs/hr of urea, 740 lbs/hr of carbamate, 1080 lbs/hr of excess ammonia, 3830 lbs/hr of water and 17 lbs/hr of by-product biuret, are let down in pressure reducing valve 11 and are introduced into the bottom section 12 of the tube side 14 of decomposer 13. Due to the adiabatic flashing through the pressure reducing valve, the aqueous urea solution is cooled to about 220°F.

The aqueous urea solution enters the tubes 14 of decomposer 13, wherein it is heated to 250°F. by condensing steam at 50 psig in the shell side 17 of decomposer 13. Due to the heating of the solution at a relatively reduced pressure, 670 lbs/hr of ammonium carbamate decompose to form 380 lbs/hr of $CO_2$ and 290 lbs/hr of $NH_3$; 1020 lbs/hr of excess ammonia are vaporized and 1580 lbs/hr are boiled off from the aqueous urea solution, and 15 lbs/hr of urea are decomposed to form 2 lbs/hr of gaseous $NH_3$ and 13 lbs/hr of by-product biuret.

The total quantity of gas thus formed amounts to 3,272 lbs/hr.

The degassed urea solution which is formed contains 9965 lbs/hr of urea, 70 lbs/hr of ammonium carbamate, 60 lbs/hr of excess $NH_3$, 2250 lbs/hr of water and 30 lbs/hr of by-product biuret.

3,272 lbs/hr of this gaseous phase and 12,375 lbs/hr of this liquid phase exit as a mixture from the top 19 of the tubes 14 at 10 psig and at 250°F. at a relatively high velocity and the mixture impinges upon deflector baffle 20.

12,375 lbs/hr of liquid phase are diverted by the baffle 20 toward the top tube sheet 21, separating the shell side 17 from the top tube side 22 of decomposer 13, and are forced to exit the top section through nozzle 23 and pipe 24.

3,272 lbs/hr of gaseous phase, separated from the liquid phase, rise through the top section 22 of decomposer 13 and are discharged from it through nozzle 26 and pipe 27.

Again, by plugging the liquid exit nozzle 23 in order to reproduce the operation of a decomposer according to the prior art, and thus by forcing the total amount of the liquid-gas mixture to be discharged through the top nozzle 26 at the same pressure of 10 psig, a noticeable drop in temperature is immediately registered, even by maintaining the steam, condensing in the shell side 17 of decomposer 13, at the same pressure of 50 psig as before.

Due to this drop in temperature, a smaller amount of gas is formed in decomposer 13. Only 610 lbs/hr of ammonium carbamate are decomposed to form 340 lbs/hr of gaseous $CO_2$ and 270 lbs/hr of gaseous $NH_3$; and only 960 lbs/hr of excess ammonia and 1200 lbs/hr of water are boiled off from the aqueous urea solution. Due to the fact that the top section 22 is now flooded with liquid and that consequently part of the degassed urea solution is flowing back into tubes 14, 29 lbs/hr instead of 15 lbs/hr of urea are decomposed to form 25 lbs/hr of by-product biuret and 4 lbs/hr of gaseous $NH_3$. Thus, the gaseous phase separated from the liquid phase contains 240 lbs/hr of gaseous $CO_2$, 1234 lbs/hr of gaseous $NH_3$ and 1200 lbs/hr of water vapor.

The liquid phase separated from the above gaseous phase contains 9951 lbs/hr of urea, 130 lbs/hr of ammonium carbamate, 120 lbs/hr of excess ammonia, 2630 lbs/hr of water and 42 lbs/hr of by-product biuret.

By comparing again the performance of a decomposer operating according to this invention and a decomposer operating according to the prior art, the superior performance of the decomposer under the new conditions is obvious:

|  | New | Prior Art |
|---|---|---|
| Carbamate decomposed, lbs/hr | 670 | 610 |
| Carbamate decomposed, % | 90.5 | 82.5 |
| Excess $NH_3$ vaporized, lbs/hr | 1020 | 960 |
| Excess $NH_3$ vaporized, % | 94.5 | 88.7 |
| Urea decomposed to biuret, lbs/hr | 15 | 29 |
| Urea decomposed to biuret, % | 0.15 | 0.29 |
| Biuret content in final urea sol'n, dry urea basis | 0.3% | 0.42% |
| Residual carbamate in sol'n | 0.6 wt% | 1.0 wt% |
| Residual excess $NH_3$ in sol'n | 0.5 wt% | 0.9 wt% |

Here again by operating in accordance with this invention, a greater amount of carbamate is decomposed than by following prior practice. Surprisingly, the greater decomposition is accompanied by a lesser production of biuret.

I claim:

1. In the process for decomposing ammonium carbamate in an aqueous urea solution containing said carbamate, urea, water and ammonia, wherein said solution is charged to a lower section of a tube and shell decomposing vessel, wherein said solution is forced upwardly through and is heated in a tube of said vessel to a temperature at which the carbamate is decomposed with the formation of a liquid phase containing urea, wter, residual ammonium carbamate and residual ammonia, and a gaseous phase containing ammonia, carbon dioxide and water vapor, wherein said phases are discharged from said tube into an upper section of said decomposing vessel above the upper surface of the heat transfer chamber of said vessel, and wherein said gas phase is discharged through a discharge line positioned proximate the top of said upper section of said decomposing vessel, the improvement which comprises:

deflecting, in said upper section, said upwardly moving phases downwardly before said phases reach said discharge line, and removing said liquid phase from an outlet located in said upper section at or below the upper extremity of said tube, thereby preventing substantially all of said liquid phase from reentering said tube.

2. The process of claim 1, wherein the upper extremity of said tube extends above said outlet to prevent said liquid from accumulating and falling back into said tube.

3. The process of claim 1, wherein said liquid phase is removed immediately through said outlet.

4. The process of claim 1, wherein said lower and upper sections and said tube of said vessel are operated at a pressure of from about 1 to about 1500 pounds per square inch absolute.

5. The process of claim 1, wherein said lower and upper sections and said tube of said vessel are operated at a temperature of from about 160° to about 340°F.

6. The process of claim 1, wherein a deflector element is interposed below said discharge line and above said outlet and extending across less than all of said upper section.

* * * * *

UNITED STATES PATENT OFFICE
CERTIFICATE OF CORRECTION

PATENT NO. : 3,929,878
DATED : December 30, 1975
INVENTOR(S) : IVO MAVROVIC

It is certified that error appears in the above-identified patent and that said Letters Patent are hereby corrected as shown below:

Column 7, line 32: after "vessel", insert --- which includes a heat transfer chamber ---.

Column 7, line 33: after "through", insert --- a tube in said heat transfer chamber ---.

Column 7, line 33: replace "heated in a tube of said vessel to" with --- heated in the tube to ---.

Column 7, line 35: replace "wter" with --- water ---.

Column 8, line 11: after "downwardly", insert --- and outwardly toward the periphery of said upper section ---.

Column 8, line 15: replace ", thereby preventing substantially" with --- , and preventing said liquid phase from accumulating in said upper section and preventing substantially ---.

Signed and Sealed this

Twenty-fourth Day of August 1976

[SEAL]

Attest:

RUTH C. MASON
*Attesting Officer*

C. MARSHALL DANN
*Commissioner of Patents and Trademarks*